United States Patent [19]

Valdo

[11] 3,756,303

[45] Sept. 4, 1973

[54] METHOD OF MAKING FOAMED METAL BODIES

[75] Inventor: Alex R. Valdo, Baton Rouge, La.

[73] Assignee: Ethyl Corporation, Richmond, Va.

[22] Filed: Feb. 16, 1972

[21] Appl. No.: 226,567

Related U.S. Application Data

[62] Division of Ser. No. 91,212, Nov. 19, 1970.

[52] U.S. Cl. .................................. 164/79, 164/98
[51] Int. Cl. .......................................... B22d 27/20
[58] Field of Search ...................... 164/79, 98, 112; 264/45

[56] References Cited
UNITED STATES PATENTS

| | | | |
|---|---|---|---|
| 1,893,330 | 1/1933 | Jones | 164/79 X |
| 2,149,702 | 3/1939 | Maris | 164/108 X |
| 2,353,444 | 7/1944 | Conradty et al. | 164/108 X |
| 3,218,684 | 11/1965 | Spink | 164/79 |

FOREIGN PATENTS OR APPLICATIONS 615,147    10/1926    France .............................. 164/79

*Primary Examiner*—R. Spencer Annear
*Attorney*—Donald L. Johnson et al.

[57] ABSTRACT

A foamed metal body or structure having large voids or hollows therein and a method of making such structures or bodies. Hollow structural shapes are encapsulated in foamed metal. Any structural shape having a melting point above that of the metal foamed and a configuration containing a void is suspended in a mold and enveloped with foamed metal. The foamed metal is solidified and the structural shape or body is encapsulated therein.

1 Claim, No Drawings

METHOD OF MAKING FOAMED METAL BODIES

This is a division, of application Ser. No. 91,212, filed Nov. 19, 1970, now pending.

BACKGROUND OF THE INVENTION

Foamed metals are conventionally prepared in rectangular solids. Such bodies are satisfactory for many building or construction purposes. A need exists for foamed metal bodies having large cores or substantial voids therein and for foamed metal bodies capable of transmitting fluids therethrough, particularly corrosive fluids.

The present invention provides a composite unit of foamed metal and other metals or materials suitable for use in cooling and heating devices.

The instant invention also provides light-weight cooling vent units, heat exchange units, evaporative units, and heating units.

The invention further provides a novel structural body suitable for use in the automobile industry as radiators and the like.

The present invention is also particularly suitable for providing an insulated fluid conducting means, particularly for carrying corrosive fluids.

SUMMARY OF THE INVENTION

The present invention relates to a foamed metal body having a hollow intercore of a metal or material having a melting point greater than the foamed metal and to a method of making such a body.

A metal or non-metal material, of a desired configuration and having a hollow opening or void therein, the melting point of which is greater than the metal to be foamed is suspended in a mold and enveloped with foamed metal. The metal or non-metal material contains a void or permits a void to be contained in the mold. Upon solidification of the foamed metal, a structure is formed which has a substantial void or hollow therein depending upon the particular configuration of the metal or materials suspended in the mold.

DESCRIPTION OF THE PREFERRED EMBODIMENTS

In the preferred embodiment of the present invention, a metal having a higher melting point than aluminum, such as copper, of a predetermined configuration, such as a hollow tube, cylinder or the like is suspended by any suitable means in a mold used for making foamed aluminum. The metal tube, etc., is completely encapsulated or enclosed with foamed aluminum and subsequently permitted to solidify. The foamed aluminum may be foamed directly in the mold or may be injected into the mold in a molten form.

An apparatus suitable for making foamed metal is described in U. S. Pat. No. 3,382,914.

Foamed metals having discrete cells therein may be produced by a variety of methods. They may be produced by expanding molten metal amalgams (British Patent No. 206,797; U. S. Pat. No. 2,434,775; U. S. Pat. No. 2,553,016); by incorporating quartzs, microballoons in the molten metal and optionally heating to expand the gas (Chemical Engineering News, June 11, 1962, Page 37); by the use of heavy metal hydride blowing agents, particularly the hydrides of titanium or zirconium (U. S. Pat. Nos. 2,393,906; 2,751,289; 2,895,819; 2,937,938; 2,974,034; 2,979,392; 2,983,597); by volatilizing organic materials during cooling of the melt (e.g., camphor as in U. S. Pat. No. 2,155,651); by volatilizing inorganics other than metal hydrides (ammonium chloride, U. S. Pat. No. 1,642,348; magnesium carbonate, calcium hydroxide, carbonitrate, U. S. Pat. No. 642,349; calcium carbonate, U. S. Pat. No. 2,191,658; ammonium bicarbonate, U. S. Pat. No. 2,671,955; cadmium or magnesium carbonate, U. S. Pat. No. 2,935,396); and by pellet metallurgical techniques (magnesium carbonate growing of magnesium metal, U. S. Pat. No. 2,935,396).

Various metals may be used as cores for the foamed metal body of the present invention. Examples of useful metals are copper, zirconium, tantalum, titanium, alloys of these metals, and alloys such as steel, brass and the like.

Materials other than metals which may be used as cores in the foamed metal bodies of the present invention are those non-metals which have a melting point higher than the foamed metal providing the encapsulation thereof. Some examples of these materials are carbides, borides, nitrides, zirconia, silicon and graphite, ceramic materials and refractory materials.

In addition to graphite and zirconia referred to hereinabove, other examples of refractories or refactory materials are kaolin, diaspore, fire-clay, alumina, silicon carbide, silica, quartz, magnesia, chromite, chrome, chromium oxide, beryllia and thoria.

The material selected for the inner core of the foamed metal will vary with the metal being foamed and with the intended use of the finished foamed metal product. The inner core material should be substantially unaffected by any fluids to be placed therein or moved therethrough.

A preferred foamed metal is foamed aluminum. By aluminum is meant substantially pure aluminum as well as aluminum alloys containing 80 percent or more and preferably 90 percent or more of aluminum. The following aluminum alloys are examples of useful alloys for preparing the foamed metal bodies of the present invention:

Alcoa Alloy 7075 (1.6°/o Cu, 2.5°/o Mg, 0.3°/o Cr, 5.6°/o Zn, remainder Al)
2024 (4.5°/o Cu, 0.6°/o Mn, 1.5°/o Mg, remainder Al)
5086 (0.45°/o Mn, 4.0°/o Mg, 0.1°/o Cr, remainder Al)
6063 (0.4°/o Si, 0.7°/o Mg, remainder Al)
Almag 35 (6°-8°/o Mg in Al)
1000 series Al (99.6°/o minimum Al)
2011 (5.5°/o Cu, 0.5°/o Pb, 0.5°/o Bi, remainder Al)
2218 (4.0°/o Cu, 1.5°/o Mg, 2°/o Ni, remainder Al)
3005 (1.2°/o Mg, 0.4°o Mg, remainder Al)
4042 (12.2°/o Si, 0.9°/o Cu, 1.1°/o Mg, 0.9°/o Ni, remainder Al)
4043 (5°/o Si, 95°/o Al)
8280 (1.5°/o Si, 1.0°/o Cu, 0.5°/o Ni, remainder Al)
Magnalium - 70°/o Al, 30°/o Mg The foamed metals used in the present construction may be prepared by processes known in the art. Preferred processes involve blowing molten metal with a suitable gas generating agent such as lithium hydride, titanium hydride, zirconium hydride and the like. Air properly entrained in a molten metal may also be used in preparing such foam. Where a blowing agent such as a metal hydride is used, viscosity control and/or strengthening additives may be used in the molten metal during the foaming process to help control the foam density pore uniformity and provide optimum strength. Representative examples of suitable processes for preparing foamed metal are found in U. S. Pat. No. 3,297,431, U. S. Pat. No. 3,300,296 and U. S. Pat. No. 3,305,902.

As pointed out above, foamed aluminum is the preferred encapsulating material. The density of the foamed aluminum may vary over a wide range. Generally, foamed aluminum having a density of less than about 50 pcf can be used. Foams ranging from 5 to 35 pcf are preferred; densities ranging below about 27 pcf are more preferred; and a foam density ranging from about 8 to about 27 pcf is most preferred.

The hollow structural shapes or bodies may be suspended in the foamed metal mold by any convenient means. For example, the body or article to be encapsulated may be suspended or held in place in the mold by wires. It may also be supported by the mold itself. In the latter case the mold may be designed to hold or support the particular type of hollow structural body to be encapsulated in the foamed aluminum. Tubular shaped bodies such as copper tubing may be held in place in the mold by shelves or recesses in the mold or otherwise physically attached to the mold. The configuration, size and shape of the hollow structural shape will in large determine the particular type of suspension to be chosen.

If fluids are to be transported or moved through the tubular body encapsulated in the foamed metal, the body will be held in place in the mold so that fluid communication can be readily obtained in the finished product. For example, openings in the tubular body will extend through the encapsulation to a desired degree.

The present invention is especially suitable for constructing interior panels of a freezing compartment with foamed metal. The voids or passageways formed or encapsulated in the foamed metal can be filled with freon or other coolants.

The instant invention may also be used for constructing wall panels or the like, wherein steam or other suitable heating fluids may be transferred through tubular bodies encapsulated in the foamed metal.

From the foregoing, it is apparent that the novel structural body of the present invention provides a structure which has a wide variety of uses, particularly providing for a light-weight body through which fluids, especially corrosive fluids, may be transmitted therethrough.

The foregoing disclosure and description of the invention is illustrative and explanatory thereof and various changes in the size, shape and materials as well as in the details of the described construction, may be made within the scope of the appended claims without departing from the spirit of the invention. What is claimed is:

1. A process for making a structural panel, which process comprises the steps of providing a mold for a rectangular panel, supporting at least one copper-base heat-exchange tube in the mold so that it extends across the panel to be molded therein, the tube having a melting point high enough so that it is not damaged by molten aluminum, then injecting into the mold molten aluminum, foaming the aluminum to give it a foam density less than about 50 pounds per cubic foot, and cooling the foamed aluminum to make a reenforced structural foam panel suitable for distributing heat.

* * * * *